(12) United States Patent  
Fukami et al.

(10) Patent No.: US 11,052,627 B2  
(45) Date of Patent: Jul. 6, 2021

(54) PRESS MACHINE

(71) Applicant: MURATA MACHINERY, LTD., Kyoto (JP)

(72) Inventors: Yasuhiko Fukami, Inuyama (JP); Takashi Senda, Inuyama (JP); Takeshi Toi, Tokyo (JP)

(73) Assignee: MURATA MACHINERY, LTD., Kyoto (JP)

( * ) Notice: Subject to any disclaimer, the term of this patent is extended or adjusted under 35 U.S.C. 154(b) by 139 days.

(21) Appl. No.: 15/742,891

(22) PCT Filed: May 10, 2016

(86) PCT No.: PCT/JP2016/063850  
§ 371 (c)(1),  
(2) Date: Jan. 9, 2018

(87) PCT Pub. No.: WO2017/010153  
PCT Pub. Date: Jan. 19, 2017

(65) Prior Publication Data  
US 2018/0361698 A1 Dec. 20, 2018

(30) Foreign Application Priority Data  
Jul. 10, 2015 (JP) .............................. JP2015-138458

(51) Int. Cl.  
B30B 15/00 (2006.01)  
B21D 5/02 (2006.01)  
(Continued)

(52) U.S. Cl.  
CPC ................. B30B 15/00 (2013.01); B21D 5/02 (2013.01); B21D 55/00 (2013.01); F16P 3/001 (2013.01)

(58) Field of Classification Search  
CPC .......... B21D 5/02; B21D 5/004; B21D 55/00; B30B 11/005; B30B 15/00;  
(Continued)

(56) References Cited

U.S. PATENT DOCUMENTS 6,708,541 B1* 3/2004 Matsumoto .............. B21D 5/02  
                                                                            72/31.1  
7,802,456 B2* 9/2010 Ikeda ....................... B21D 5/02  
                                                                            72/31.05

(Continued)

FOREIGN PATENT DOCUMENTS

JP     05-111797 A    5/1993  
JP     10-137993 A    5/1998  
(Continued)

OTHER PUBLICATIONS

Letter Frequency, Wikipedia, Jul. 5, 2015. (Year: 2015).*

(Continued)

*Primary Examiner* — Shelley M Self  
*Assistant Examiner* — Sarkis A Aktavoukian  
(74) *Attorney, Agent, or Firm* — Keating & Bennett, LLP

(57) ABSTRACT

A press machine includes a machine body that is able to press a workpiece and a notifier that notifies an operator of the operation of the machine body or the state of the workpiece in advance using at least one of a sound and light selected in accordance with the operation of the machine body.

15 Claims, 7 Drawing Sheets

(51) Int. Cl.
*B21D 55/00* (2006.01)
*F16P 3/00* (2006.01)

(58) Field of Classification Search
CPC ... B30B 15/0041; B30B 15/14; B30B 15/148; B30B 15/166; B30B 15/26; B30B 15/28; B30B 15/281; B30B 15/282; B30B 15/284; B30B 15/286; B30B 15/287; B30B 15/288
USPC .................. 100/341, 342, 346, 347, 348
See application file for complete search history.

(56) References Cited

U.S. PATENT DOCUMENTS

2008/0197998 A1  8/2008  Campmans
2014/0132720 A1* 5/2014  Rogers ............... B21D 5/02
                                              348/46

FOREIGN PATENT DOCUMENTS

JP     11-188500 A    7/1999
JP     2008-261158 A  10/2008
JP     4565633 B2     10/2010

OTHER PUBLICATIONS

White, Ron, et. al., How Computers Work, 7th Ed., Que Corporation, Oct. 15, 2003. (Year: 2003).*
Official Communication issued in International Patent Application No. PCT/JP2016/063850, dated Aug. 16, 2016.
English translation of Official Communication issued in International Patent Application No. PCT/JP2016/063850, dated Aug. 16, 2016.

* cited by examiner

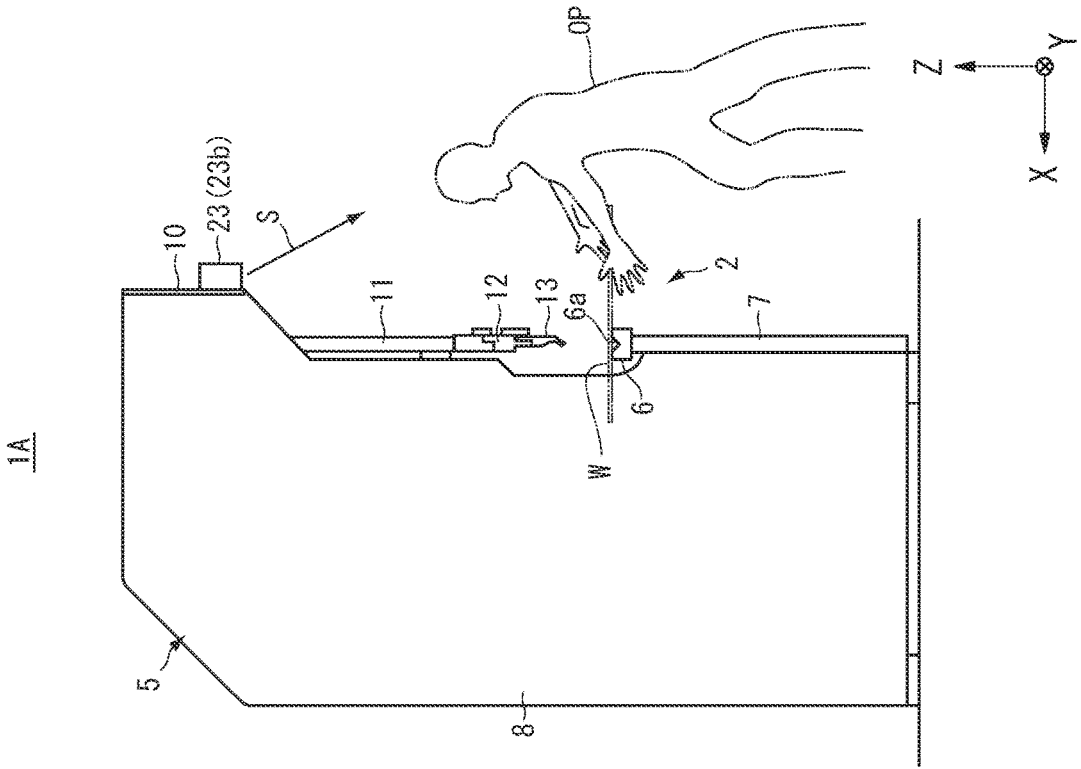
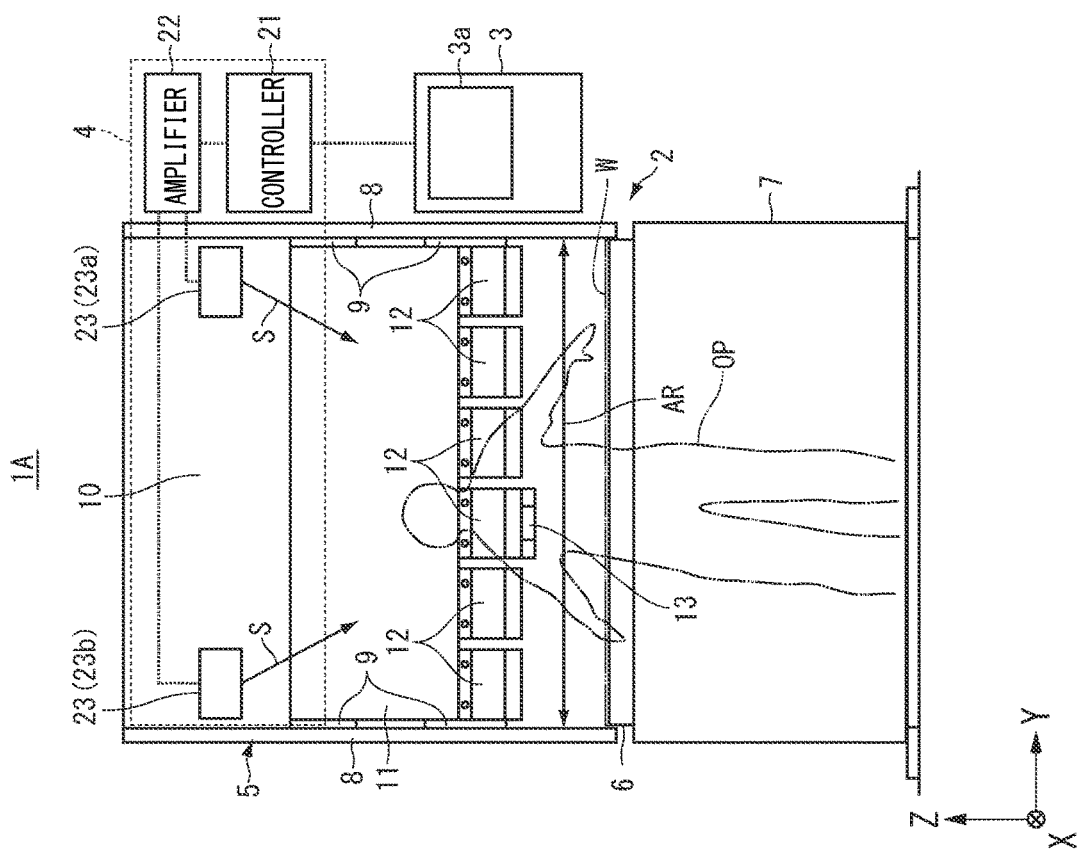

PRESS MACHINE

BACKGROUND OF THE INVENTION

1. Field of the Invention

The present invention relates to a press machine.

2. Description of the Related Art

A press machine performs pressing such as forming on a workpiece while sandwiching the workpiece using an upper tool and a lower tool. Known press machines include bending machines (press brakes) that are able to bend a workpiece (for example, see Japanese Patent No. 4565633). In operating a press machine, the operator holds a workpiece with a hand. Accordingly, the operator has to ensure safety and is placed under stress. For this reason, Japanese Patent No. 4565633 discloses that the anxiety of the operator is eliminated by providing an inter-blade distance transmission means that transmits the magnitude of the inter-blade distance between a punch and a die to the operator using light or sound.

Since the above press machine notifies the operator of physical quantities such as the inter-blade distances at respective time points, the operator has to predict the operation of the press machine and the behavior of the workpiece. Thus, the operator may be placed under stress. For example, the inter-blade distance transmission means notifies the operator of the current inter-blade distance. Accordingly, if there is a delay in the operator recognizing a sound indicating that the inter-blade distance has been narrowed, the time for the operator to respond to the current inter-blade distance is reduced. For this reason, the operator has to be sensitive so that the operator does not fail to hear the sound indicating the inter-blade distance. As seen above, sounds indicating physical quantities such as the inter-blade distances at respective time points are used as warning sounds. For example, such sounds may stress the operator and thus reduce the workability thereof.

SUMMARY OF THE INVENTION

Preferred embodiments of the present invention have been made in view of the foregoing, and provide press machines that reduce a load on an operator.

A press machine according to a preferred embodiment of the present invention includes a machine body that is able to press a workpiece and a notifier that notifies an operator of operation of the machine body or a state of the workpiece in advance using at least one of a sound and light selected in accordance with the operation of the machine body.

The notifier may include a controller that controls a signal indicating the sound and a speaker that outputs the sound on the basis of the signal. The press machine may include a body controller that controls the operation of the machine body in accordance with a machining program. The machining program may include a code associated with the operation of the machine body, and the controller may output the sound from the speaker on the basis of the code. The body controller may supply the code to the controller before the machine body operates. The machining program may include information about the workpiece, and the controller may set a type of the sound to be outputted from the speaker in accordance with the information about the workpiece. The press machine may include at least one of a sensor that detects the operation of the machine body and a sensor that detects a situation of the workpiece. The controller may output the sound from the speaker on the basis of a detection result of the sensor. The controller may be able to set at least one of a timing when the sound is outputted from the speaker and a type of the sound to be outputted from the speaker on the basis of information about the operator. The controller may notify of a side on which machining will be performed, of a machining region of the machine body by controlling a direction in which the sound is outputted from the speaker. The speaker may include speakers disposed on both sides of the machining region, and the controller may notify of a side on which machining will be performed, of a machining region of the machine body by outputting the sound selectively from the speakers on the both sides. The controller may be able to adjust at least one of frequency characteristics and damping characteristics of the sound to be outputted from the speaker. The press machine may include a storage that stores a sound list indicating candidates of the sound. The controller may select, from the sound list, a sound to be outputted from the speaker. The sound may include at least one of a voice and a melody. The notifier may notify the operator of the operation of the machine body or the state of the workpiece in advance by displaying an image indicating the operation of the machine body or the state of the workpiece on a display in synchronization with the sound or the light. The notifier may output at least one of a phase-adjusted sound, a sound comfortable for the operator, and a rhythm sound so that at least one of an operation sound of the machine body and an ambient sound is canceled out.

In preferred embodiments of the present invention, the notifier notifies the operator of the operation of the machine body or the state of the workpiece in advance. Thus, the operator is able to respond to the operation of the machine body, and the load such as stress on the operator is able to be reduced.

If the notifier includes a controller that controls a signal indicating the sound and a speaker that outputs the sound on the basis of the signal, the sound to be outputted from the speaker is able to be accurately controlled by the controller. If the press machine includes a body controller that controls the operation of the machine body in accordance with a machining program; the machining program includes a code associated with the operation of the machine body; and the controller outputs the sound from the speaker on the basis of the code, the operation of the machine body and the sound are able to be reliably matched with each other. If the body controller supplies the code to the controller before the machine body operates, an advance notification is able to be provided reliably before the machine body operates. If the machining program includes information about the workpiece and the controller sets a type of the sound to be outputted from the speaker in accordance with the information about the workpiece, an advance notification is able to be provided using a sound of a type corresponding to the workpiece. If the press machine includes at least one of a sensor that detects the operation of the machine body and a sensor that detects a situation of the workpiece and the controller outputs the sound from the speaker on the basis of a detection result of the sensor, an advance notification is able to be provided in accordance with the operation of the machine body or the situation of the workpiece. If the controller is able to set at least one of a timing when the sound is outputted from the speaker and a type of the sound to be outputted from the speaker on the basis of information about the operator, an advance notification is able to be changed in accordance with, for example, the skill level of the operator. If the controller provides notification of a side on which machining will be performed of a machining region of the machine body by controlling a direction in which the sound is outputted from the speaker, the operator is able to know the side on which machining will be performed, in advance and thus is able to smoothly perform the operation.

If the speaker includes speakers disposed on both sides of the machining region and the controller provides notification of a side on which machining will be performed, of a machining region of the machine body by outputting the sound selectively from the speakers on the both sides, the controller is able to easily notify the operator of the side on which machining will be performed, with the simple control of selecting a speaker from which the sound is outputted. If the controller is able to adjust at least one of frequency characteristics and damping characteristics of the sound to be outputted from the speaker, an advance notification is able to be provided using a sound which is more likely to be heard by the operator in accordance with, for example, the situation of the environment. If the press machine includes a storage that stores a sound list indicating candidates of the sound and the controller selects, from the sound list, a sound to be outputted from the speaker, it is easy for the operator to associate the operation of the machine body and the sound with each other, since an advance notification is provided using a sound selected from the predetermined sound list. If the sound includes at least one of a voice and a melody, it is easy to distinguish between, for example, a sound for advance notification and a warning sound. Thus, the load such as stress on the operator is able to be reduced. If the notifier notifies the operator of the operation of the machine body or the state of the workpiece by displaying an image indicating the operation of the machine body or the state of the workpiece on a display in synchronization with the sound or the light, the operator is more likely to grasp and quickly understand the operation of the machine body or the state of the workpiece. Thus, the load on the operator is able to be reduced. If the notifier outputs at least one of a phase-adjusted sound, a sound comfortable for the operator, and a rhythm sound so that at least one of an operation sound of the machine body and an ambient sound is canceled out, comfort is provided to the operator and the working environment. Thus, the working efficiency is able to be increased.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B are plan views showing a press machine of a first preferred embodiment of the present invention.

DETAILED DESCRIPTION OF THE PREFERRED EMBODIMENTS

Figure 2:
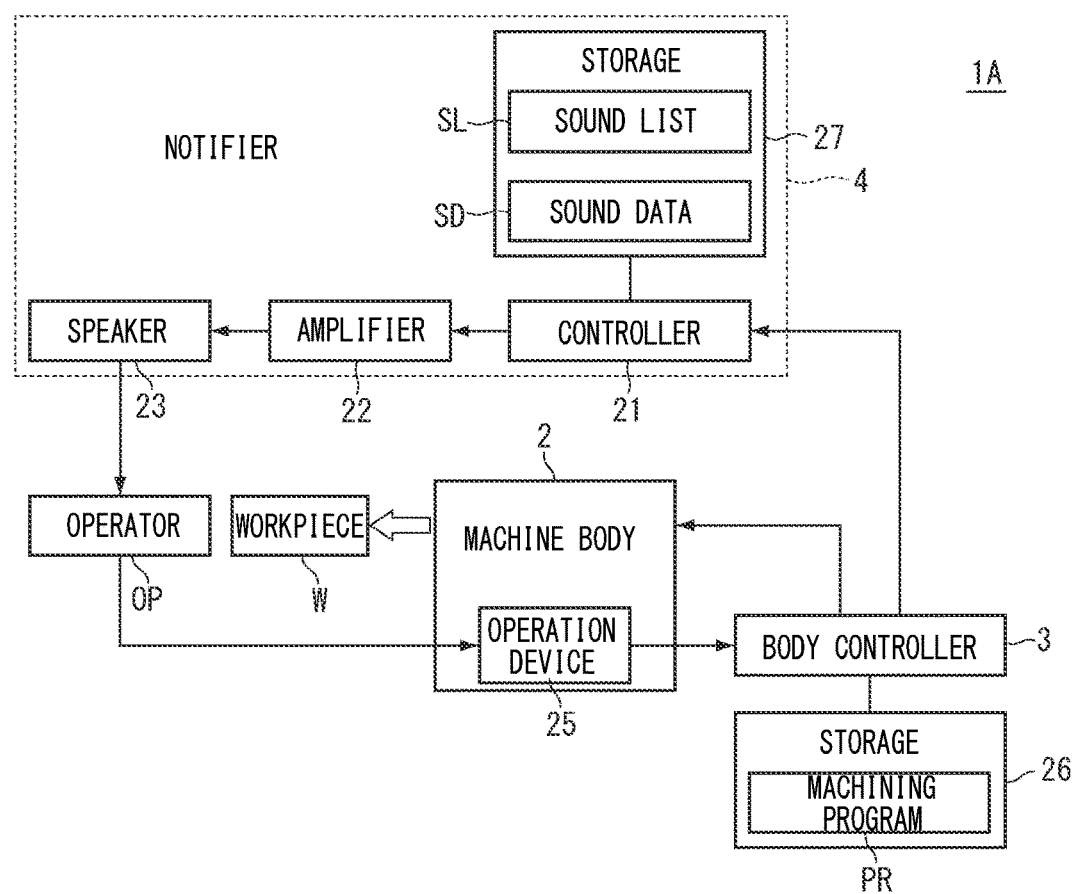
FIG. 2 is a block diagram showing the press machine of the first preferred embodiment of the present invention.

Now, preferred embodiments of the present invention will be described with reference to the drawings. However, the present invention is not limited to the preferred embodiments below. The members may be schematized or scaled as necessary in the drawings. The positions, directions, and the like of the members will be described with reference to an XYZ Cartesian coordinate system shown in FIGS. 1A and 1B and the like as necessary. In this XYZ Cartesian coordinate system, an X-direction and a Y-direction are horizontal directions, and a Z-direction is the vertical direction. The X-direction is the depth direction, and the Y-direction is the left-right direction. Sides represented by arrows in the X-, Y-, and Z-directions are referred to as positive sides (e.g., the positive Z-side), and sides opposite to the sides are referred to as negative sides (e.g., the negative Z-side).

FIG. 1A is a front view of a press machine 1A of a preferred embodiment of the present invention, and FIG. 1B is a side view of the press machine 1A. The press machine 1A preferably is a bending machine (press brake) that is able to bend (form) a workpiece W. While, in the present preferred embodiment, a bending machine (press brake) is described as an example of the press machine 1A, the press machine 1A may be, for example, a press machine that is able to punch the workpiece W. The press machine 1A includes a machine body 2, a body controller 3, and a notifier 4.

The machine body 2 is able to perform pressing such as bending on the workpiece W held (supported) by an operator OP. The machine body 2 includes a body frame 5, a table 7 supporting a lower tool 6 (die), and a pair of side panels 8. The body frame 5 defines the outline of the press machine 1A. The lower tool 6 is a fixed (lower) die and has a length extending in the Y-direction. The lower tool 6 (see FIG. 1B) has, for example, a V-shaped recess 6a for forming. The table 7 is installed on the front side of the body frame 5 and fixes the lower tool 6. The side panels 8 are mounted on left-side and right-side portions of the body frame 5. Each side panel 8 includes inwardly protruding guide plates 9 provided in two upper and lower locations thereof. An upper cover panel 10 is mounted on front upper portions of the portions between the pair of side panels 8.

Multiple drivers (not shown) are provided behind (on the positive X-side of) the upper cover panel 10. The drivers are supported by a support frame or the like (not shown). The drivers move (raise and lower) a ram 11 in the Z-direction. Each driver is, for example, a mechanism that rotates a ball screw or nut using an electric motor or the like or a mechanism using a hydraulic or pneumatic cylinder.

The ram 11 is connected to the drivers through junctions (not shown) and is disposed so as to be suspended from the drivers. The ram 11 is a tabular member preferably made of a metal or the like and weighs, for example, several tens to several hundred kg. A pair of rollers are disposed behind (on the positive X-side of) the ram 11 such that the guide plates 9 are sandwiched therebetween. The pair of rollers are supported by brackets (not shown). The pair of rollers are guided by the guide plates 9 and thus the ram 11 is guided in the Z-direction.

The ram 11 includes multiple upper-tool holders 12 mounted on a lower portion thereof. The upper-tool holders 12 are arranged in the Y-direction. The upper-tool holders 12 are disposed so as to be movable in the Y-direction, and the distance between the upper-tool holders 12 may be set to any distance. The upper-tool holders 12 are disposed so as to be detachable from the ram 11. The upper-tool holders 12 are able to hold corresponding upper tools 13. For example, if bending is performed, the upper-tool holders 12 hold multiple types of upper tools 13 corresponding to bending steps. When the upper tools 13 are held by the upper-tool holders 12, they are disposed opposite to the recess 6a of the lower tool 6. The upper tools 13 have front ends that enter the recess 6a of the lower tool 6. The ram 11, the upper-tool holders 12, and the upper tools 13 are moved in the Z-direction integrally. The upper tools 13 move toward the lower tool 6 as the ram 11 moves, and the workpiece W is sandwiched between the upper tools 13 and the lower tool 6. Thus, the machine body 2 bends the workpiece W.

The body controller 3 controls the operation of the machine body 2 in accordance with a machining program. The body controller 3 is disposed, for example, in an operation panel. The body controller 3 controls the drivers in accordance with a command of the operator OP or the machining program. The body controller 3 is able to display, on a display 3a, various types of information such as the operation situation and operation conditions of the machine body 2 and the machining conditions of the workpiece W. The operation OP is able to input, to the body controller 3, information such as the settings of the machine body 2, the material of the workpiece W, and the machining conditions.

The notifier 4 notifies the operator OP of the operation of the machine body 2 in advance using a sound S selected in accordance with the operation of the machine body 2. The sound S is, for example, a voice (voice guidance), a melody including multiple scales, or a tune (e.g., BGM). The sound S is selected from sounds that cause less stress, on the basis of human auditory sense. For example, the sound S has frequency and damping characteristics that do not make a human feel like the sound is grating. For example, the sound S is set to a sound other than a beep or siren. The sound S also has frequency and damping characteristics that allow a human to distinguish the sound from a warning sound.

The notifier 4 includes a controller 21, an amplifier 22, and speakers 23. The controller 21 controls a signal indicating the sound S. For example, the controller 21 is disposed outside the body controller 3 and connected to the body controller 3 so as to be able to communicate therewith. The controller 21 controls the signal indicating the sound S. For example, the controller 21 supplies the analog signal indicating the sound S to the amplifier 22 before the machine body 2 operates. The amplifier 22 is a power amplifier or the like. The amplifier 22 amplifies the signal supplied by the controller 21 and supplies the resulting signal to the speakers 23. Note that at least one of the controller and the amplifier 22 may be disposed in the unit (e.g., operation panel) containing the body controller 3.

The speakers 23 preferably are acoustic speakers or the like and are connected to the amplifier 22 by wire or wirelessly. The internal cone paper of each speaker 23 vibrates on the basis of the signal (current, voltage) supplied by the amplifier 22 and thus the speaker 23 outputs a sound corresponding to the signal. Each speaker 23 is disposed such that the sound reaches a machining region AR of the machine body 2. The machining region AR is a region in which the machine body 2 is able to perform bending. For example, the machining region AR is a range in which the upper tools 13 and the lower tool 6 are disposed in the Y-direction. The speakers 23 are mounted on the upper cover panel 10 and disposed above a working space for the operator OP. The positions and orientations of the speakers 23 are appropriately set so that the sound S reaches the operator OP. For example, the speakers 23 may be disposed on the sides of the working space for the operator OP.

The speakers 23 are disposed on both sides of the machining region AR of the machine body 2. One speaker (represented by reference sign 23a in FIGS. 1A and 1B) is disposed on the positive Y-side of the center of the machining region AR, and the other speaker (represented by reference sign 23b in FIGS. 1A and 1B) is disposed on the negative Y-side of the center of the machining region AR. In accordance with the signal of the sound S, the controller 21 may output the sound S from both the speakers 23a, 23b simultaneously or may output the sound S from only one of the speakers 23a, 23b. Also, the controller 21 may output the sound S from both the speakers 23a, 23b at the same volume or may output the sound S from the speakers 23a, 23b at different volumes. While the speakers 23a, 23b preferably are disposed inside the machining region AR in FIGS. 1A and 1B, the speakers may be disposed outside the machining region AR.

The speakers 23 may define a speaker system with the amplifier 22 or the like. The speakers 23 may also be earphones, headphones, or the like. If the speakers 23 are, for example, earphones, they may be connected to the amplifier 22 wirelessly, for example, using Bluetooth®. Also, if the speakers 23 are earphones or the like and if the speakers 23 are able to be driven with low power, the amplifier 22 need not be provided. In this case, the speakers 23 are connected to the controller 21 by wire or wirelessly and configured to output a sound S in accordance with a signal supplied by the controller 21. Note that the number of speakers 23 included in the notifier 4 is any number and may be one or three or more.

FIG. 2 is a block diagram showing a press machine of a first preferred embodiment of the present invention. The machine body 2 includes an operation device 25 operable by the operator OP. The operation device 25 is, for example, an operation pedal or operation lever, and the operator OP is able to input, for example, a command to start operation to the machine body 2 using the operation device 25. If the operation device 25 detects that it has been operated by the operator OP, it supplies the detection result to the body controller 3. A storage 26 is connected to the body controller 3 so as to be able to communicate therewith.

The storage 26 is, for example, a large-capacity storage such as a hard disk, a non-volatile memory such as a USB memory or flash memory, or a storage medium such as a CD. The storage 26 stores a machining program PR. The machining program PR is a program (machining data) that defines the operation of the machine body 2 in each step. For example, the machining program PR defines the order of bending steps, information (e.g., type, ID, position) about an upper tool 13 used in each step, and the movement conditions (e.g., start position, speed, end position) of the ram in each step. The machining program PR includes codes corresponding to the steps.

For example, these codes define the operation of the machine body 2 in the respective steps and correspond to commands such as a command to "lower the ram 11 from the middle stage to the lower stage." The body controller 3 causes the machine body 2 to perform operations corresponding to the codes included in the machining program PR in the order of the codes. Before causing the machine body 2 to perform the operations corresponding to the codes, the body controller 3 supplies, to the controller 21, a code corresponding to the subsequent operation. For example, the body controller 3 supplies a code to the controller 21, provides a predetermined time lag, and then causes the machine body 2 to start an operation corresponding to this code.

The controller 21 outputs a sound S from the speakers 23 on the basis of this code. For example, the controller 21 selects a sound corresponding to the code based on the code supplied by the body controller 3 and outputs the selected sound from the speakers 23. A storage 27 is connected to the controller 21 so as to be able to communicate therewith. The storage 27 is, for example, a large-capacity storage such as a hard disk, a non-volatile memory such as a USB memory or flash memory, or a storage medium such as a CD. The storage 27 stores a sound list SL and sound data SD.

The sound list SL is table data where codes representing operations of the machine body 2 and the types of sounds (e.g., the types of voices, the types of melodies) corresponding to the operations of the machine body 2 are associated with each other. The sound data is data representing multiple sounds set for the operations of the machine body 2. For example, the sound data SD is digital acoustic data conforming to any standard such as the MP3 format.

The controller 21 selects, from the sound list SL, a sound S to be outputted from the speaker 23. For example, when the controller 21 receives a code from the body controller 3, it compares the code with the sound list SL in the storage 27 and obtains the type of a sound corresponding to the code. The controller 21 then obtains, from the sound data SD, acoustic data corresponding to the type of the sound obtained by the comparison with the sound list SL. For example, the controller 21 AD-converts the acoustic data (music file) obtained from the sound data SD into an analog signal and supplies the analog signal to the amplifier 22. The amplifier 22 amplifies the signal supplied by the controller 21 as necessary and supplies the resulting signal (e.g., current, voltage) to the speakers 23. Note that the controller 21 may select the type of a sound to be outputted from the speaker 23, from multiple sound sources stored in another location rather than from the sound list SL.

The speaker 23 outputs a sound S on the basis of the signal supplied by the controller 21 through the amplifier 22. Note that the sound data SD may be text data indicating a voice guidance that transmits information using a human voice. The controller 21 may convert the sound data SD in text format into acoustic data using a text reading function or the like.

The timing when the sound S is outputted from the speakers 23 is set so as to precede the timing when the machine body 2 starts to operate. The time from when the sound S is outputted from the speakers 23 to when the machine body 2 starts to operate is able to be adjusted on the basis of, for example, the time from when the body controller 3 supplies the code to the controller 21 to when the machine body 2 starts to operate or the time from when the controller 21 receives the code to when the sound is outputted from the speakers 23.

As seen above, the press machine 1A notifies the operator of the operation of the machine body 2 in advance. The operator OP is able to know the operation of the machine body 2 in advance by recognizing the sound S from the speakers 23. Thus, for example, the operator OP is able to make a preparation for an operation or the like required for the subsequent step or start such an operation with leeway until the machine body 2 starts to operate after the operator has recognized the sound S. Also, an advance notification using a sound is advantageous in that such a notification is more likely to be recognized by the operator OP, since the sound is less likely to be interrupted by an object or the like and thus less likely to fail to reach the operator OP. Further, in the case of an advance notification using a sound, the operator OP is able to recognize such a notification while seeing the workpiece W or the hand.

The machining program PR may include information about the workpiece W. The controller 21 may set the type of a sound S to be outputted from the speakers 23 in accordance with the information about the workpiece W. The information about the workpiece W is, for example, the material, thickness, or bendability of the workpiece W. The behavior (e.g., bending speed, bending orientation) of the workpiece W varies with the material, thickness, machining conditions, or the like thereof. If the controller 21 outputs a sound S corresponding to the information about the workpiece W from the speakers 23, the operator OP is more likely to predict the behavior of the workpiece W.

In the present preferred embodiment, the controller 21 may set at least one of the timing when a sound S is outputted from the speakers 23 and the type of a sound S to be outputted from the speakers 23, on the basis of the information about the operator OP. The information about the operator OP is, for example, the skill level (e.g., expert level, beginner level) of the operator and is inputted to the notifier 4 by the operator OP. For example, if the skill of the operator OP is the beginner level, the controller 21 advances the timing when a sound S is outputted from the speakers 23. In this case, the time from when the operator OP recognizes the sound S to when the machine body 2 operates is increased, making the operator OP more likely to follow the operation of the machine body 2.

Also, if the skill of the operator OP is the beginner level, the controller 21 increases the types of sounds S outputted in each step and outputs sounds S corresponding to the stages of each step. In this case, the operator OP is able to know which stage of which step the present stage is, and therefore is more likely to respond to the subsequent operation of the machine body 2. If the skill of the operator OP is the expert level, the controller 21 may delay the timing when a sound S is outputted from the speakers 23 or reduce the types of sounds S outputted in each step.

The controller 21 is able to adjust at least one of frequency characteristics and damping characteristics of a sound S to be outputted from the speakers 23. The controller 21 is also able to adjust a sound S to be outputted from the speakers 23 on the basis of information about the environment (installation environment) of the machine body 2. For example, if other press machines are installed around the machine body 2 (press machine 1A), a sound S outputted from the speakers 23 is mixed into sounds outputted from the speakers of the other press machines. This makes the operators of the press machines less likely to hear the sounds or more likely to mishear the sounds.

In this case, the controller 21 adjusts at least one of the frequency characteristics and damping characteristics so that the sound S from the press machine 1A is less likely to reach the operators of the other press machines, on the basis of a command of the operator OP or preset information about the installation environment. The frequency characteristics or damping characteristics are able to be adjusted, for example, by switching between equalizer pre-settings that define the gains of respective frequencies. Note that by giving directivity to a sound to be outputted from the speakers 23, a sound outside a predetermined region (e.g., machining region AR) may be made less likely to be recognized. The notifier 4 may set a silence area and a comfortable-sound area using an active control. For example, a silence area may be provided by outputting a phase-adjusted sound (e.g., opposite-phase sound) so that the operation sound of the machine body 2 or the ambient sound (the mechanical sounds of other apparatuses, etc.) in the building is canceled out. Also, a comfortable-sound area may be provided by outputting a comfortable sound (a sound comfortable for the operator OP, a sound capable of relaxing the operator OP, etc.) to the operator OP, or a rhythm sound or the like may be outputted. These give comfort to the operator OP and the in-plant (building) working environment and thus the working efficiency is able to be increased.

Figure 3:
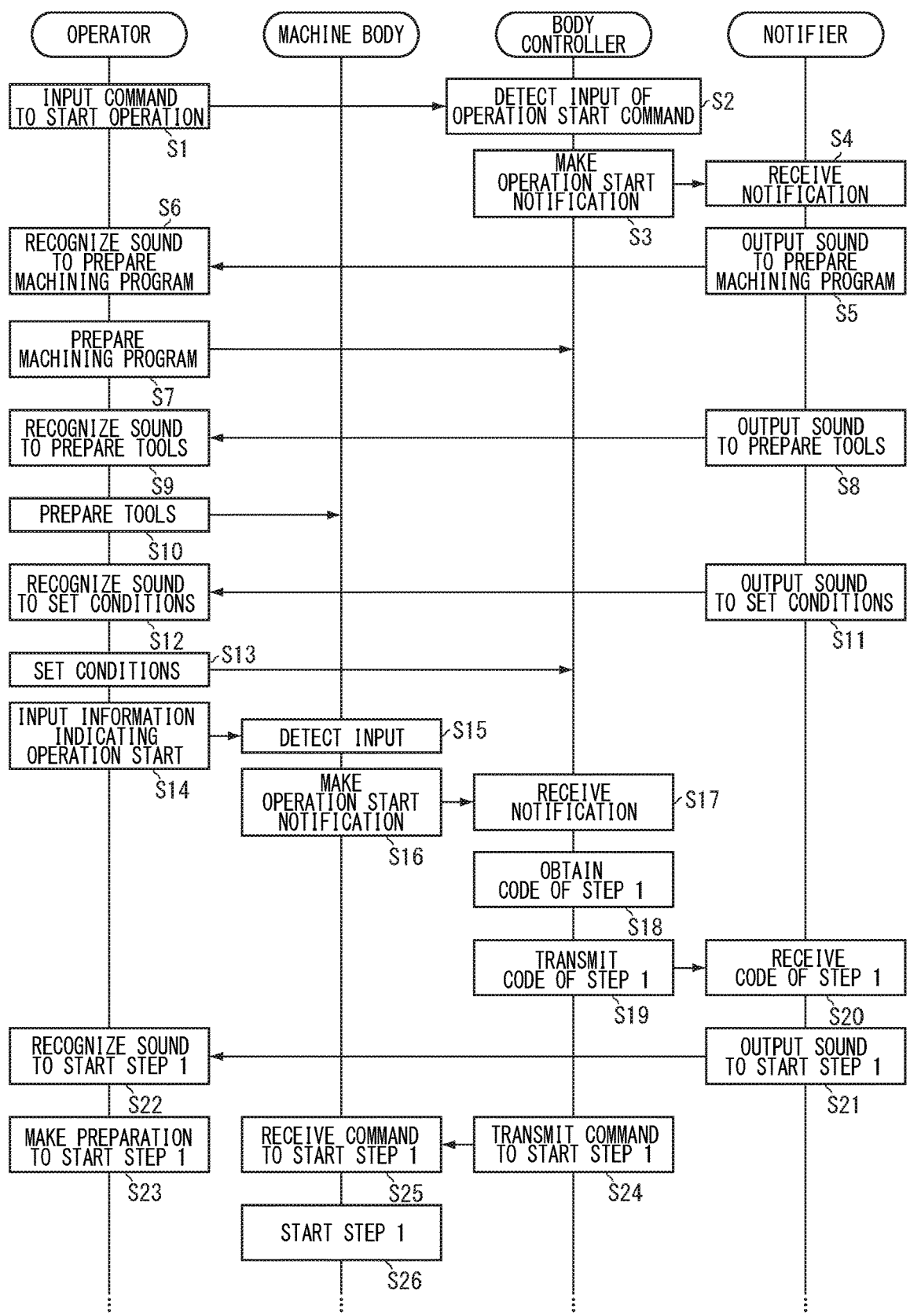
FIG. 3 is a sequence diagram showing the operation of the press machine of the present preferred embodiment of the present invention.

Next, a non-limiting example of a pressing method (machining method) according to a preferred embodiment of the present invention will be described on the basis of the operation of the press machine 1A. FIG. 3 is a sequence diagram showing the operation of the press machine of the present preferred embodiment. Before the operator OP starts to operate the press machine 1A, the press machine 1A is turned on and becomes ready (standby) by performing start operations such as return-to-origin. In step S1, the operator OP inputs a command to start operation to the body controller 3. In step S2, the body controller 3 detects that the operation start command has been inputted.

In step S3, the body controller 3 provides a notification that the operation start command has been inputted, to the notifier (e.g., controller 21). In step S4, the notifier 4 receives the notification. In step S5, the controller 21 obtains sound data associated with "operation start" from the sound list SL. Then, for example, the controller 21 outputs a sound to prepare the machining program, from the speaker 23. This sound may be, for example, a voice guide that "prepare the machining program" or a melody associated with the preparation of the machining program.

The operator OP recognizes the sound to prepare the machining program, in step S6 and prepares the machining program in step S7. For example, the operator OP prepares the machining program PR by storing the machining program PR in the storage 26 (see FIG. 2) or selecting the machining program PR previously stored in the storage 26.

In step S8, the notifier 4 outputs a sound to prepare tools. This sound may be, for example, a voice guide that "prepare tools" or a melody associated with the preparation of tools. The notifier 4 may perform step S8 when a predetermined time elapses since the performance of step S5. Or, after the body controller 3 provides a notification that the machining program PR has been prepared, to the notifier 4, the notifier 4 may perform step S8 in accordance with this notification. The operator OP recognizes the sound to prepare tools, in step S9 and prepares the tools in step S10.

For example, the operator OP prepares the tools by setting the upper tools 13 used for press in the upper-tool holders 12. In step S11, the notifier 4 outputs a sound to set conditions. This sound may be, for example, a voice guide that "set conditions" or a melody associated with the setting of conditions. The notifier 4 may perform step S11 when a predetermined time elapses since the performance of step S8.

Or, after the operator OP inputs information indicating that the tools have been prepared, to the body controller 3 and the body controller 3 provides a notification that the tools have been prepared, to the notifier 4, the notifier 4 may perform step S11 in accordance with this notification. The operator OP recognizes the sound to set conditions, in step S12 and sets conditions in step S13. For example, the operator OP sets conditions by inputting operation conditions to the body controller 3 or selecting operation conditions previously stored in the storage 26.

In step S14, the operator OP inputs information indicating the start of operation, for example, by operating the operation device 25, such as an operation pedal. The machine body 2 detects that the operation device 25 has been operated, in step S15 and provides a notification that the information indicating the start of operation has been inputted, to the body controller 3 in step S16. The body controller 3 receives the notification in step S17 and obtains the code of the first step (hereafter referred to as step 1) from the machining program PR in step S18.

The body controller 3 transmits the code of step 1 to the notifier 4 in step S19, and the notifier 4 receives the code of step 1 in step S20. In step S21, the notifier 4 outputs a sound to start step 1. For example, the controller 21 of the notifier 4 compares the code of step 1 with the sound list SL and identifies the type of a sound associated with step 1. The controller 21 then obtains acoustic data corresponding to the identified type of the sound from the sound data SD and plays back this acoustic data.

The operator OP recognizes the sound to start step 1, in step S22 and performs preparation to start step 1, in step S23. The body controller 3 transmits a command to start step 1 to the machine body 2 in step S24, and the machine body 2 receives the start command in step S25. The machine body 2 starts step 1 in step S26, which is later than step S22.

Figure 4:
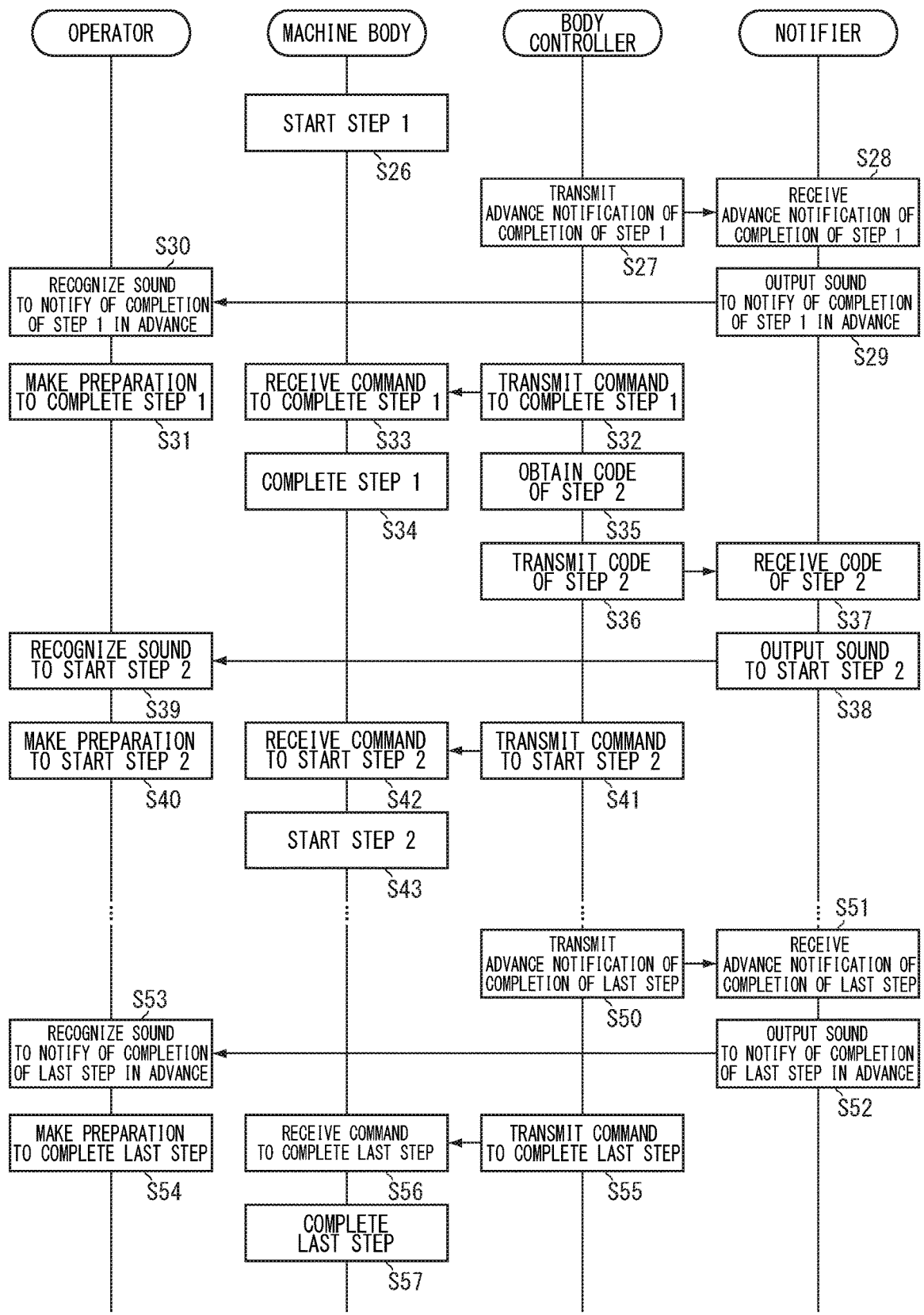
FIG. 4 is a sequence diagram continued from FIG. 3.

FIG. 4 is a sequence diagram continued from FIG. 3. After the machine body 2 starts step 1 in step S26, the body controller 3 monitors the operation of the machine body 2 and determines which stage of step 1 the operation of the machine body 2 is. Before the operation of the machine body 2 is complete in step 1, the body controller 3 transmits an advance notification of the completion of step 1 to the notifier 4 in step S27. For example, the body controller 3 performs step S27 when the operation of the machine body 2 in step 1 reaches a predetermined stage. The notifier 4 receives the advance notification of the completion of step 1 in step S28 and outputs a sound to notify of the completion of step 1 in advance, in step S29. This sound may be a voice guide that "step 1 will be complete," a melody associated with the completion of step 1, or the like.

The operator OP recognizes the sound to notify of the completion of step 1 in advance, in step S30 and performs a preparation to complete the operation relating to step 1 in step S31. The body controller 3 transmits a command to complete step 1, to the machine body 2 in step S32, and the machine body 2 receives the command to complete step 1, in step S33. The machine body 2 completes step 1 in step S34. The body controller 3 obtains the code of the subsequent step (hereafter referred to as step 2) from the machining program PR in step S35. As in steps S18 to S34, the press machine 1A performs steps S35 to S43 relating to step 2.

The press machine 1A sequentially performs steps defined in the machining program PR. In step S50, the body controller 3 transmits, to the notifier 4, an advance notification of the completion of the last step defined in the machining program PR. The notifier 4 receives the advance notification of the completion of the last step in step S51 and outputs a sound to notify of the completion of the last step in advance, in step S52. This sound may be a voice guide that "the last step will be complete," a melody associated with the completion of the last step, or the like.

If multiple workpieces W are sequentially machined, the sound outputted by the notifier 4 in step S52 may say that "there is a workpiece to be machined next," "there remain N number of workpieces to be machined," or the like, or may be a sound indicating whether there is a workpiece to be machined next. The operator OP recognizes the sound to notify of the completion of the last step in advance, in step S53 and performs a preparation to complete the operation relating to the last step, in step S54. The body controller 3 transmits a command to complete the last step, to the machine body 2 in step S55, and the machine body 2 receives the command to complete the last step, in step S56. The machine body 2 completes the last step in step S57, which is later than step S53.

While, in the present preferred embodiment, the notifier 4 preferably notifies the operator OP of the operation of the machine body in advance, for example, it may notify the operator OP of the state of the workpiece W. The state of the workpiece W is, for example, the degree of bending of the workpiece W or the bending direction of the workpiece W. For example, the notifier 4 notifies the operator OP of the direction in which the workpiece W will be bent as bending proceeds from now on, in advance as a possible state of the workpiece W. If the orientation of cutting/raising is inverted, the orientation of jumping of the workpiece W in bending is also inverted. For this reason, if the notifier 4 notifies the operator OP of the state of the workpiece W, the operator OP is made more likely to handle the workpiece W.

Second Preferred Embodiment

Figure 5A:
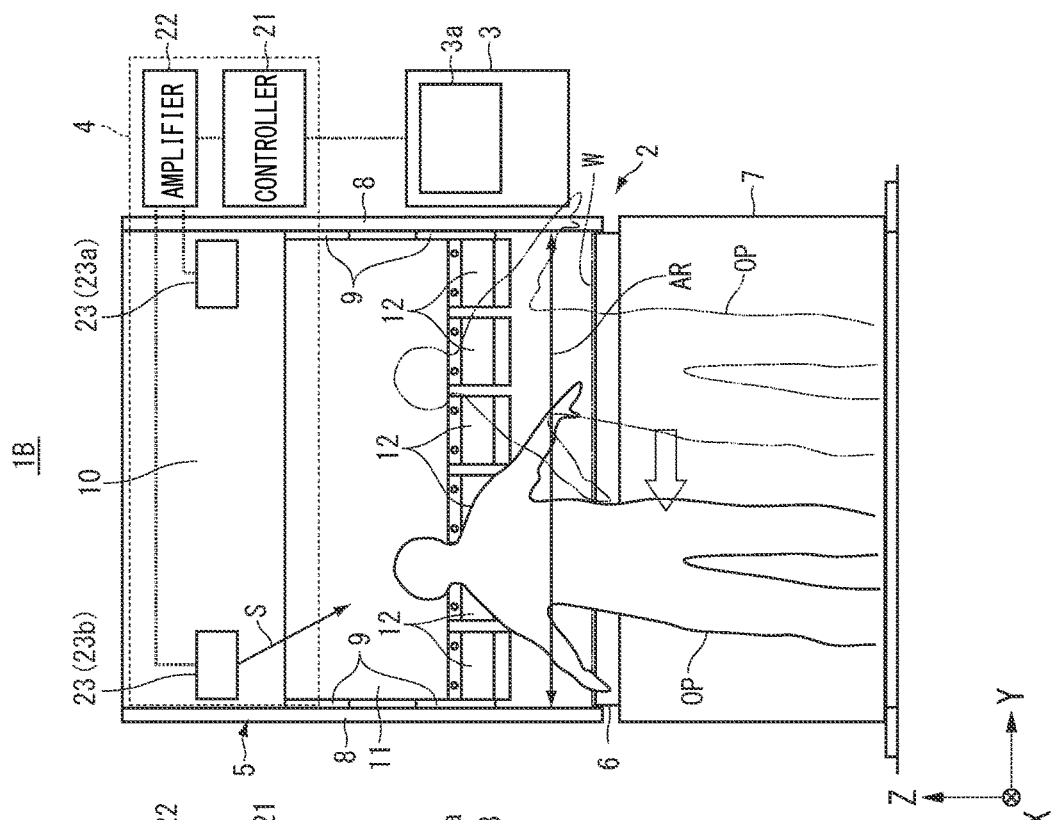
FIGS. 5A and 5B are drawings showing a press machine of a second preferred embodiment of the present invention.
Figure 5B:
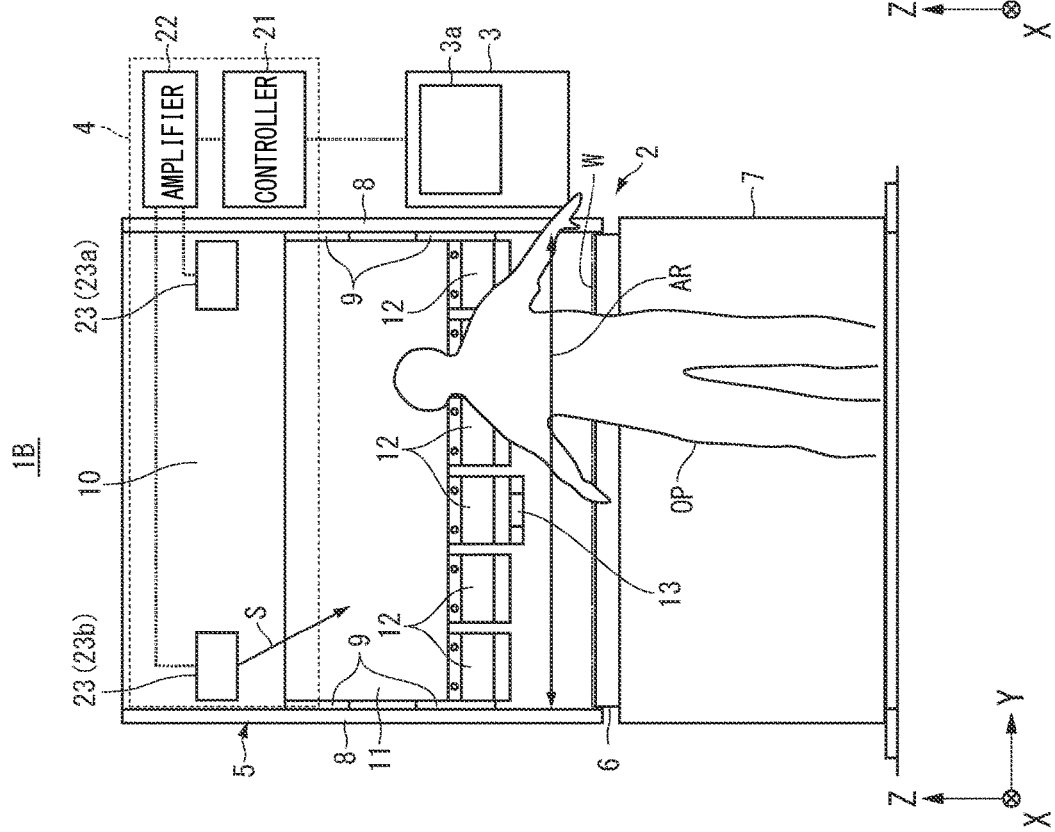

A second preferred embodiment of the present invention will be described. In the present preferred embodiment, elements similar to those of the above preferred embodiment are given the same reference signs and description thereof will be omitted or simplified. FIGS. 5A and 5B include drawings showing a press machine 1B of the second preferred embodiment. A controller 21 of the press machine 1B notifies an operator OP of the side on which machining will be performed, of a machining region AR of a machine body 2 by controlling the direction in which a sound S is outputted from speakers 23. The controller 21 controls the direction in which a sound S is outputted from the speakers 23 by outputting the sound S selectively from speakers 23a, 23b on both sides.

For the convenience of description, it is assumed that the current machining is performed on the positive Y-side of the machining region AR and the subsequent machining is performed on the negative Y-side after the operator OP moves to the negative Y-side. In this case, the controller 21 outputs a sound S from the speaker 23b on the negative Y-side, where machining will be performed, and does not output a sound from the speaker 23a on the positive Y-side. The operator OP is able to know the side on which the subsequent machining will be performed by recognizing from which side the sound S has been outputted. As shown in FIG. 5B, the operator OP is able to move to the position where machining will be performed, with leeway before the subsequent machining is started.

The controller 21 may notify the operator OP of the processing side by setting the volume of the speaker 23a to be different from the volume of the speaker 23b. For example, in FIG. 5A, the controller 21 may notify the operator OP that the subsequent machining will be performed on the negative Y-side, where the speaker 23b is disposed, by outputting a sound from the speaker 23b at a greater volume than that from the speaker 23a. Or, the controller 21 may notify the operator OP of the side on which machining will be performed, by issuing a voice guidance that "the subsequent machining will be performed on the left side" or the like. If the number of speakers 23 included in the notifier 4 is one, the controller 21 may adjust the direction in which a sound S is outputted, by changing the orientation of the speaker 23.

The controller 21 may notify the operator OP of the side on which machining will be performed, in accordance with information (e.g., skill level) about the operator OP. For example, if the operator OP is the beginner level, the controller 21 notifies the operator OP of the side on which machining will be performed; if the operator OP is the expert level, it need not notify the operator OP of the side on which machining will be performed. Or, the controller 21 need not notify the operator OP of the side on which machining will be performed or may be able to switch between notification mode and non-notification mode.

Third Preferred Embodiment

Figure 6:
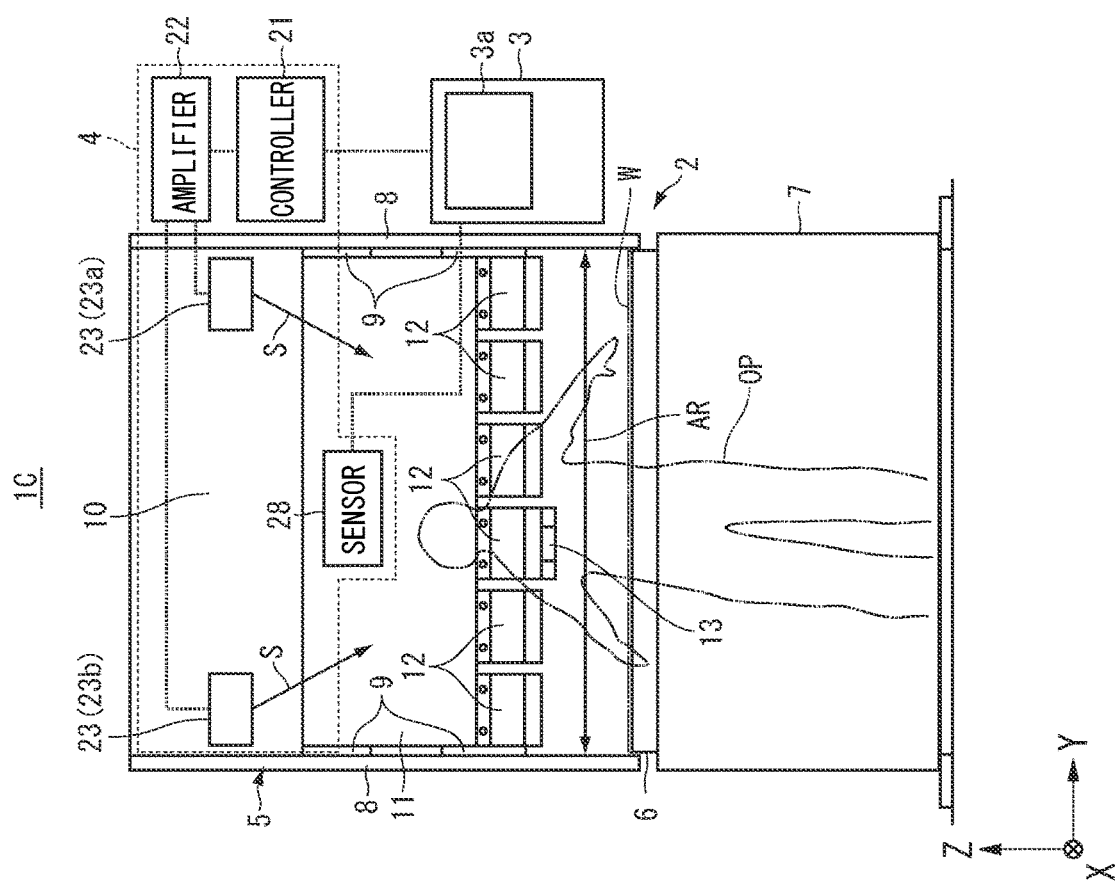
FIG. 6 is a drawing showing a press machine of a third preferred embodiment of the present invention.

A third preferred embodiment of the present invention will be described. In the present preferred embodiment, elements similar to those of the above preferred embodiments are given the same reference signs and description thereof will be omitted or simplified. FIG. 6 is a drawing showing a press machine of the third preferred embodiment.

In a press machine 1C of the present preferred embodiment, a notifier 4 includes a sensor 28 that detects the operation of a machine body 2. For example, the sensor 28 detects the position information (e.g., position, speed, acceleration) of a ram 11. The sensor 28 is connected to a body controller 3 so as to be able to communicate therewith and supplies the detection result to the body controller 3.

The body controller 3 controls the position of the ram 11 on the basis of the detection result of the sensor 28. The body controller 3 also determines in which of a series of machining stages the current operation of the machine body 2 is, on the basis of the detection result of the sensor 28 and supplies information about the operation of the machine body 2 to be performed next, to the controller 21. The controller 21 selects a sound associated with the information about the operation of the machine body 2, based on the information about the operation of the machine body 2 supplied by the body controller 3, and outputs the selected sound from speakers 23.

The sensor 28 may detect the situation of the workpiece W. For example, the sensor 28 may optically detect the shape (e.g., the degree of bending) of the workpiece W, and the notifier 4 may notify the operator OP of the state of the workpiece W in advance on the basis of the detection result of the sensor 28. The notifier 4 may make an advance notification without using codes in a machining program PR or may make an advance notification using both the detection result of the sensor 28 and the codes in the machining program. The sensor 28 may be included in a member other than the notifier 4, for example, in the machine body 2.

Fourth Preferred Embodiment

Figure 7:
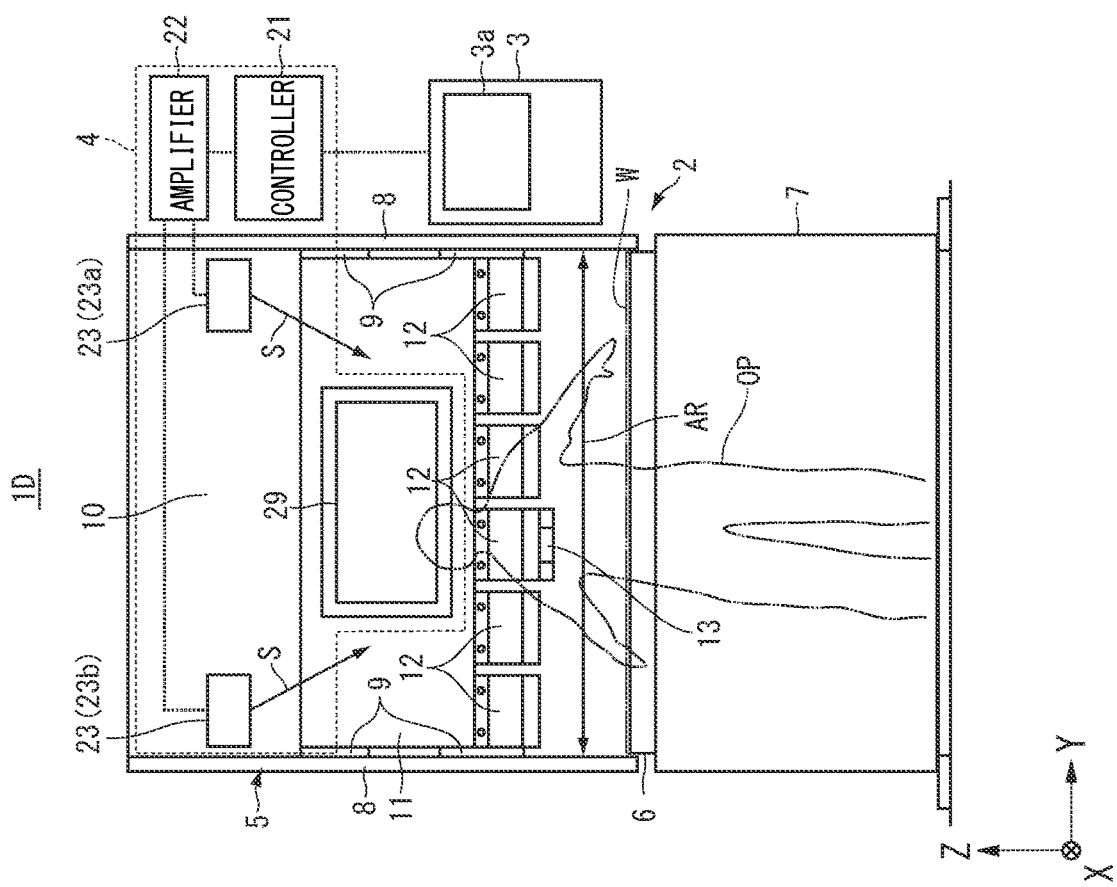
FIG. 7 is a drawing showing a press machine of a fourth preferred embodiment of the present invention.

A fourth preferred embodiment of the present invention will be described. In the present preferred embodiment, elements similar to those of the above preferred embodiments are given the same reference signs and description thereof will be omitted or simplified. FIG. 7 is a drawing showing a press machine 1D of the fourth preferred embodiment.

In the press machine 1D, a notifier 4 includes a display 29. The notifier 4 notifies an operator OP of the operation of a machine body 2 or the state of a workpiece W in advance by displaying an image showing the operation of the machine body 2 or the state of the workpiece W on the display 29.

The notifier 4 displays the image on the display 29 in synchronization with the output of at least one of a sound and light. The display 29 is disposed, for example, on a ram 11, but may be disposed in another location. The display 29 may be a part of the notifier 4 or may be a part of a device other than the notifier 4. For example, the notifier 4 may display an image on a display 3*a* disposed in an operation panel or the like rather than on the display 29. The notifier 4 may also display an image by projecting the image on the display 29 rather than displaying the image on the display 29.

While the preferred embodiments of the present invention have been described, the technical scope of the present invention is not limited to the preferred embodiments or modifications thereof. The features or elements described in the preferred embodiments or modifications may be combined with each other as necessary. For example, in the preferred embodiments, an advance notification is preferably provided to the operator mainly using a sound, but other methods may be used. For example, the notifier 4 may provide an advance notification using only light or may provide an advance notification using both a sound and light. In the case of an advance notification using light, an advance notification corresponding to the operation of the machine may be made using, for example, changes in the lighting intensity of a lamp, changes in the lighting time of the lamp, the distinction between lighting and blinking, or changes in the color of light emitted by the lamp.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A press machine comprising:
   a machine body that is able to press a workpiece;
   a storage that stores a machining program;
   a body controller to control the machine body in accordance with the machining program; and
   a notifier including a controller and further including a speaker and/or a lamp; wherein
   the machining program includes code associated with a future operation of the machine body; and
   the controller included in the notifier controls the notifier to notify an operator of the future operation of the machine body in advance of the future operation of the machine body using the speaker and/or the lamp to output at least one of a sound and a light selected based on the code associated with the future operation of the machine body.

2. The press machine of claim 1, wherein the controller included in the notifier controls a signal indicating the sound; and
   the notifier includes the speaker that outputs the sound based on the signal.

3. The press machine of claim 2, wherein
   the machining program includes information about the workpiece; and
   the controller included in the notifier sets a type of the sound to be outputted from the speaker in accordance with the information about the workpiece.

4. The press machine of claim 2, further comprising at least one of a sensor that detects a current operation of the machine body and a sensor that detects a current situation of the workpiece; wherein
   the controller included in the notifier outputs the sound from the speaker based on a detection result of the at least one of the sensor that detects the current operation of the machine body and the sensor that detects the current situation of the workpiece.

5. The press machine of claim 2, wherein the controller included in the notifier sets at least one of a timing when the sound is outputted from the speaker and a type of the sound to be outputted from the speaker based on information about the operator.

6. The press machine of claim 2, wherein the controller included in the notifier provides notification of a side on which machining will be performed of a machining region of the machine body by controlling a direction in which the sound is outputted from the speaker.

7. The press machine of claim 2, wherein
   the speaker includes speakers disposed on both sides of a machining region of the machine body; and
   the controller included in the notifier provides notification of a side on which machining will be performed of the machining region of the machine body by outputting the sound selectively from the speakers on the both sides.

8. The press machine of claim 2, wherein the controller included in the notifier adjusts at least one of frequency characteristics and damping characteristics of the sound to be outputted from the speaker.

9. The press machine of claim 2, further comprising an additional storage that stores a sound list indicating candidates of the sound; wherein
   the controller included in the notifier selects, from the sound list, a sound to be outputted from the speaker.

10. The press machine of claim 2, wherein the sound comprises at least one of a voice and a melody.

11. The press machine of claim 2, wherein
    the notifier includes a display; and
    the notifier notifies the operator of the future operation of the machine body in advance by displaying an image indicating the future operation of the machine body on the display in synchronization with the at least one of the sound or the light.

12. The press machine of claim 2, wherein the notifier outputs at least one of a phase-adjusted sound and a rhythm sound so that at least one of an operation sound of the machine body and an ambient sound is canceled out.

13. The press machine of claim 1, wherein the sound comprises at least one of a voice and a melody.

14. The press machine of claim 1, wherein the notifier includes a display; and the notifier notifies the operator of the future operation of the machine body in advance by displaying an image indicating the future operation of the machine body on the display in synchronization with the at least one of the sound or the light.

15. The press machine of claim 1, wherein the notifier outputs at least one of a phase-adjusted sound and a rhythm sound so that at least one of an operation sound of the machine body and an ambient sound is canceled out.

* * * * *